Patented Aug. 6, 1940

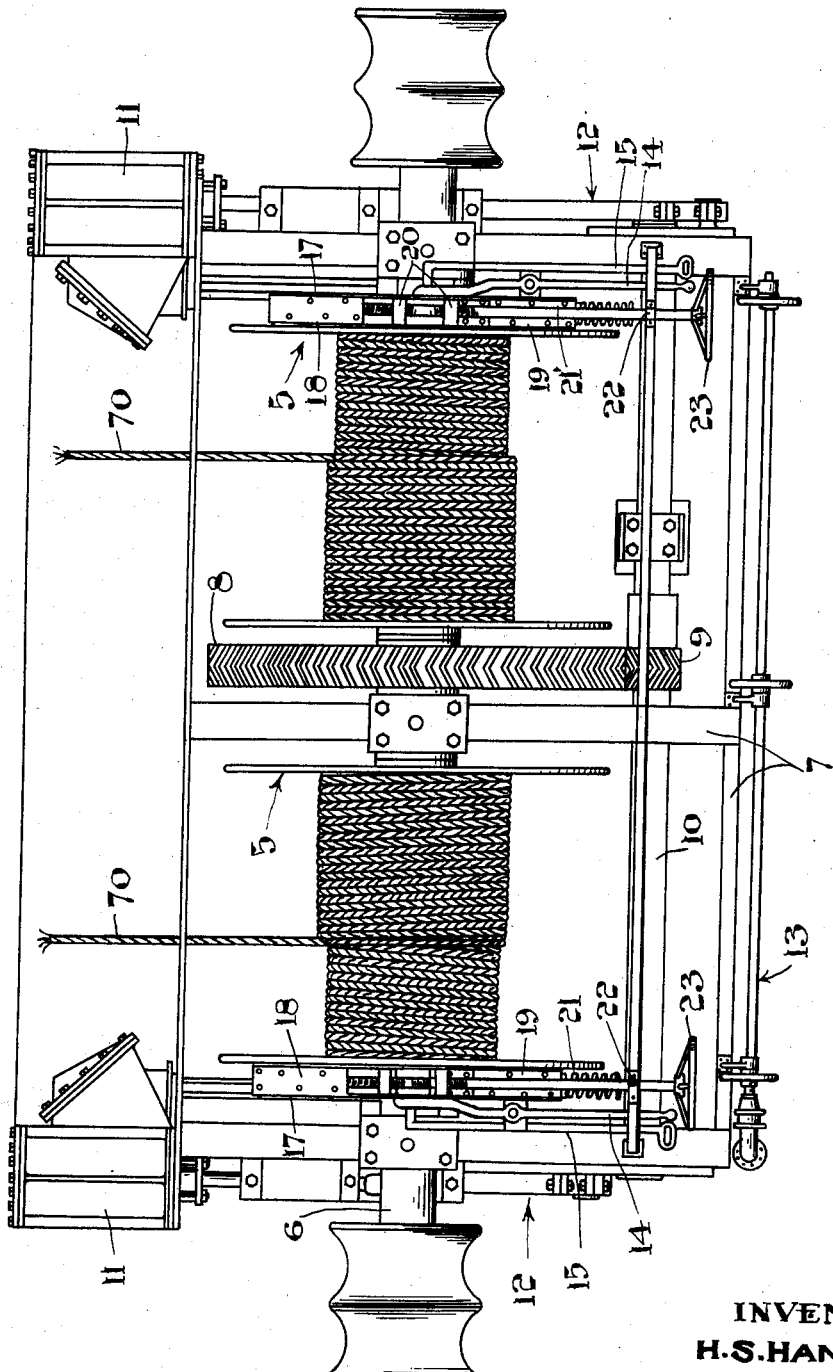

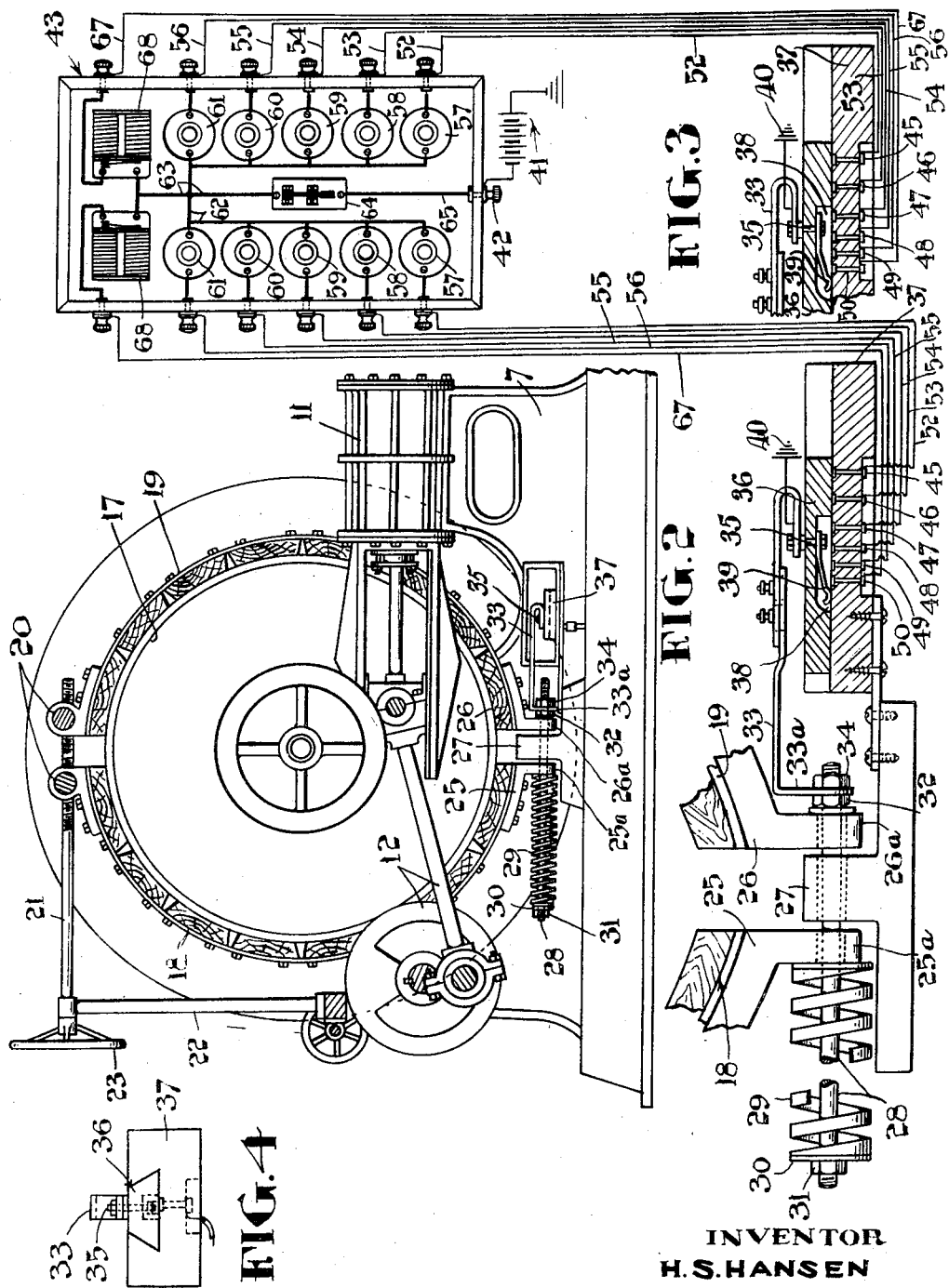

2,210,759

UNITED STATES PATENT OFFICE 2,210,759

TRAWL MEASURING MECHANISM

Hans S. Hansen, Halifax, Nova Scotia, Canada

Application September 16, 1937, Serial No. 164,214

1 Claim. (Cl. 265—1)

This invention relates to improvements in trawling apparatus. More particularly, the invention resides in the provision of means for continuously indicating the strain on the towing cables in addition to ensuring sufficient slippage between the cable drums and the brakes to prevent damage to the trawling gear when the net catches on ledges, rocks or other obstacles on the ocean bottom.

According to this invention the brakes employed for holding the cable drums during the towing of the net are fitted with pressure applying springs which are compressed to permit slipping between the cable drums and the brakes page when the strain on the cables exceeds the strain which the brakes are initially set to resist, a distinctive feature of the invention being that each brake comprises shoes which are pressed against the brake drum by a spring arranged to be increasingly stressed by displacement of one of the shoes around the drum, the movable shoe being connected to a strain indicator which indicates the radial pressure that is actually applied on the brake bands to hold the drum as well as the load which is on the cables when the drums are just slipping under some one of the preset radial pressures.

Proceeding now to a more detailed description of this invention reference will be had to the accompanying drawings, wherein—

Fig. 1 is a top plan view of a trawl winch designed in accordance with this invention.

Fig. 2 is an end view of the winch assembly appearing in Fig. 1.

Fig. 3 is a diagrammatic view showing one method of utilizing the force imposed on the winch brake to indicate the strain on the cables.

Fig. 4 is an end view of one of the brake operated contactors appearing in Fig. 3.

Figure 5:
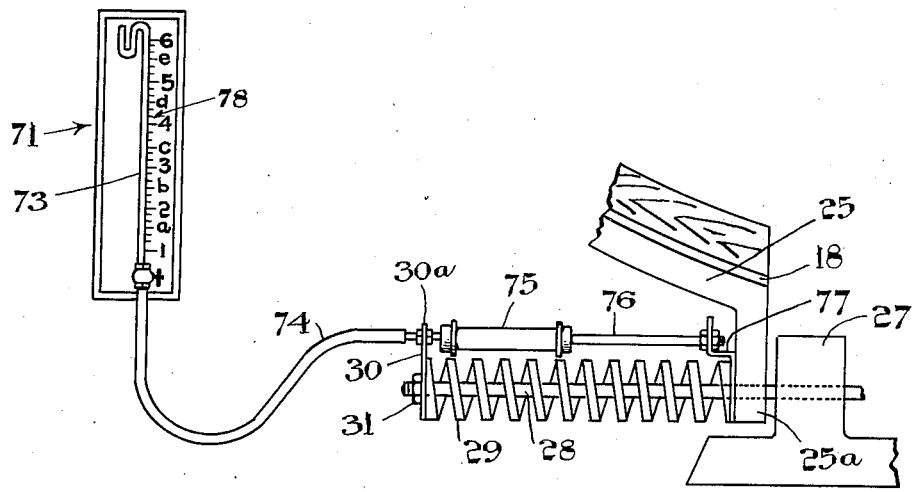
Fig. 5 is a view of a modified strain indicator adapted to be substituted for the indicator shown in Fig. 3.

In these drawings I have shown a trawl winch comprising two cable drums 5 loosely mounted on a common drum shaft 6 journalled in the winch frame 7. A gear wheel 8 is fixed to shaft 6 between the drums 5 and is driven by a pinion 9 on a shaft 10 also journalled in frame 7. Shaft 10 is driven by two steam engines 11 through conventional drive connections 12. Operation of engines 11 is controlled by a conventional throttle mechanism indicated at 13 in Fig. 1.

Levers 14 (Fig. 1) are provided for operating suitable clutches (not shown) to establish or disrupt drive connections between the drums 5 and the shaft 6. Levers 15 (Fig. 1) are provided for operating conventional safety locks (not shown) which are associated in a well known manner with the drum clutches controlled by the levers 14.

Suitable brake drums 17 are fixed to the outer ends of the cable drums 5. Each drum 17 is engaged by a brake band comprising two sections indicated at 18 and 19. The upper ends of sections 18 and 19 are provided with fittings 20 in screw threaded engagement with oppositely threaded portions of a brake applying spindle 21 which is journalled in standard 22 and is operated by the brake hand wheel 23. The lower ends of sections 18 and 19 are provided with L-shaped fittings 25 and 26 presenting vertical arms 25a and 26a disposed at opposite sides of an abutment member 27 projecting upwardly from the base of frame 7. The arms 25a and 26a are apertured for the passage of a bolt 28 which also passes loosely through a suitable opening formed in the abutment member 27. A spring 29 is arranged on the bolt 28 between the arm 25a and a washer 30 which is held in place by a nut 31. Bolt 28 also carries a nut 32 which is held against the outer side of the arm 26a by the thrust of spring 29 against the washer 30.

Bolt 28 carries a contact arm 33 provided with a bent end 33a which is clamped to the bolt by nuts 32 and 34. The free end of arm 33 is fastened, by bolt 35, to a movable contact carrier 36 mounted to slide on a cooperating stationary contact carrier 37. The carrier 36 is provided with a recess 38 housing a wiper contact 39. One end of contact 39 is disposed to wipe the upper surface of the stationary carrier 37 while the other end is electrically connected, through bolt 35, to the contact arm 33. As indicated at 40 the bolted end of contact 39 is grounded to one terminal of a battery 41 having its remaining terminal connected to the binding post 42 of a strain indicator 43 (Fig. 3).

The stationary carrier 37 is provided with a line of spaced stationary contacts 50, 49, 48, 47, 46 and 45 arranged to be successively engaged by the wipe contact 39 when the movable contact carrier 36 is moved to the right from the position shown in Fig. 3. The stationary contacts 50, 49, 48, 47 and 46 are respectively connected, by conductors 52, 53, 54, 55, 56, lamps 57, 58, 59, 60, 61, conductors 62, 63, switch 64, conductor 65 and binding post 42, to the insulated terminal of battery 41. The remaining contact 45 of the carrier 37 is also connected, by conductor 67, buzzer 68, conductor 63, switch 64 and conductor 65, to binding post 42.

In the use of the apparatus described herein the brakes are released and the warp or net cables 70 (Fig. 1) are let out to the desired length. The brake hand wheels 23 are then operated to set the brakes to stand a certain amount of strain sufficient for ordinary fishing. The drums are then declutched from the shaft 6. With the brakes set the arms 25a engage with the abutments 27 and the springs 29 are slightly compressed owing to the pull of the arms 26a on the bolt 28, the tendency of the arms 26a being to move away from the abutment under the action of the brake drums 17 which tend to turn anticlockwise (Fig. 2) owing to the pull on the warps. As the weight in the net increases the hand wheels 23 are operated to tighten the brake bands around the brake drums to prevent rotation of the cable drums and the said tightening causes the arms 26a to move further away from the abutments 27, the springs 29 being further compressed. Successive tightenings of the brake bands necessitated by the progressively increasing drag of the nets causes the arms 26a further to recede from the abutments 27. The wiper contacts 39 are, therefore, moved to the right over successive contacts 50, 49, 48, 47 and 46 to effect successive lighting of the lamps 57, 58, 59, 60 and 61 to give visual indication of the additional strain imposed on the cables and nets. As the strain on the cables increases toward the danger point the wiper contacts 39 move into engagement with the stationary contacts 45 so that the buzzers 68 are energized to give a warning signal, the amount of slippage possible between the cable drums and the brake bands permitted by the compression of the springs 29 being sufficient to give the pilot an opportunity to stop the ship before any serious damage is done.

In Fig. 5 I have shown a modification in which a hydraulic strain indicator 71 is substituted for the previously mentioned indicator 43. In this case the indicator comprises a graduated glass tube 73 having its lower end connected by a flexible tube 74, to one end of a pump cylinder 75, the said end of the cylinder being fixed to an extension 30a of the washer 30 which is positioned between the nut 31 and the adjacent end of spring 29. The piston rod 76 of the piston (not shown) working in cylinder 75 is connected to a plate 77 interposed between the spring 29 and the brake band arm 25a. With this arrangement it will be apparent that, as the spring 29 is compressed, fluid is forced from the pump cylinder 75 through tube 74 to the indicator tube 73 and will rise in the latter to a height depending upon the compression of the spring, the level of the fluid in tube 73 being noted on the graduated scale 78 as a pressure of the strain on the cables.

Figure 6:
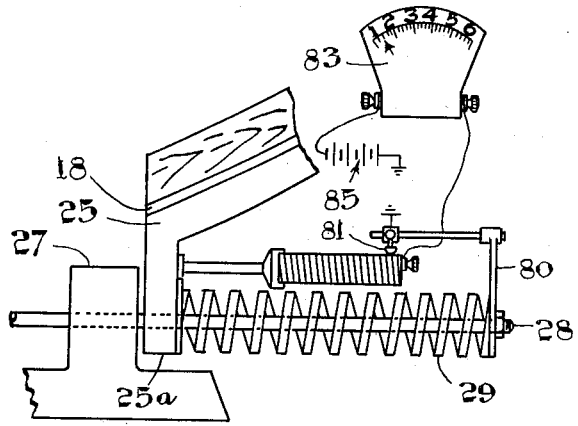
Fig. 6 is a view showing a further type of strain indicator which may be substituted for the indicator appearing in Figs. 2 and 3.

In Fig. 6 is shown a further modification wherein the arm 25a (said arm being viewed from the side opposite to that from which the arms 25a are viewed in Figs. 2, 3 and 5), carries a resistance coil 82. As the bolt 28 is pulled by the action of arm 26a (not shown) a grounded contact 81 carried by an arm 80 fixed to the spring moves along the said resistance and causes the reading of the volt meter 83 to vary in accordance with the strain on the warps, one terminal of the volt meter being connected by lead 84 to one end of the resistance and the other terminal of the volt meter being connected to a grounded battery 85.

The apparatus described herein has numerous advantages. It not only enables the pilot to check the strain on the cables but also provides for sufficient slippage between the cable drums and the brake band to prevent injury to the trawling gear as the result of excessive strain due to the net running into ledges, rocks or other obstacles on the ocean bottom. With this apparatus the pilot is enabled to determine approximately the amount of fish in the net and the towing time of the net relative to the amount of fish it contains. The apparatus in question also gives an accurate indication of the radial pressure that is actually applied on the brake bands to hold the drum and also the load on the cables when the drums are just slipping under some one of the present preset radial pressures. It may also be pointed out that the association of an indicator with each brake enables the torque pull on each warp or cable to be indicated separately on a graduated scale which is not affected by the torque pull on the companion warp or cable. Another advantage of the described apparatus is that, when the net is towed in deeper water or a harder towing bottom is encountered the additional strain is registered by the indicating device so that the brakes may be set according to the readings to compensate for the extra load.

Having thus described my invention, what I claim is:

Trawling apparatus comprising a power shaft, a drum loosely mounted on said shaft and adapted to be releasably clutched thereto, a net towing cable wound on said drum, a brake for holding the drum when the latter is declutched from said shaft, said brake comprising a pair of drum engaging shoes, a brake tightening spindle in threaded engagement with corresponding ends of said shoes, a stationary abutment interposed between the remaining ends of said shoes, a bolt passing loosely through the last mentioned ends of the shoes and through said stationary abutment, said bolt having a brake shoe abutment thereon engaging the outer side of one of said shoes, a spring encircling said bolt between the outer side of the remaining shoe and a spring abutment carried by said bolt, said spring serving, in conjunction with said bolt, to press the brake shoes against the drum in such manner that the spring is increasingly stressed by displacement of one of the shoes around the drum, and means operating in response to displacement of the movable shoe to indicate the braking pressure on the drum and the load which is on the cables when the drum is just slipping under the applied braking pressure.

HANS S. HANSEN.